United States Patent [19]

Yokota

[11] Patent Number: 4,679,100
[45] Date of Patent: Jul. 7, 1987

[54] ROTARY HEAD TYPE MAGNETIC RECORDING AND REPRODUCING DEVICE

[75] Inventor: Hiroshi Yokota, Saitama, Japan

[73] Assignee: Pioneer Electronic Corporation, Tokyo, Japan

[21] Appl. No.: 769,905

[22] Filed: Aug. 27, 1985

[30] Foreign Application Priority Data

Aug. 31, 1984 [JP] Japan ................... 59-180707

[51] Int. Cl.[4] ................ G11B 5/86; G11B 27/02
[52] U.S. Cl. ........................... 360/15; 360/141
[58] Field of Search ............. 360/15, 14.1, 9.1, 62, 360/64

[56] References Cited

U.S. PATENT DOCUMENTS 3,142,032 7/1964 Jones ........................... 360/9.1
3,157,738 11/1964 Okamura ..................... 360/9.1
3,928,868 12/1975 Grindley et al. ................ 360/15

Primary Examiner—Vincent P. Canney
Attorney, Agent, or Firm—Sughrue, Mion, Zinn, Macpeak, and Seas

[57] ABSTRACT

A rotary head type magnetic recording and reproducing device intended for dubbing one tape from another wherein the effects of vibration, jitter, etc., during the dubbing operation are substantially eliminated. First and second rotary heads, one for each of the two magnetic tapes, are carried by respective rotary disks. The rotary disks are mounted on a single shaft, and the latter is rotated by a single drum motor.

2 Claims, 4 Drawing Figures

ROTARY HEAD TYPE MAGNETIC RECORDING AND REPRODUCING DEVICE

BACKGROUND OF THE INVENTION

The present invention relates to a mechanism for dubbing data with a magnetic recording and reproducing device having a rotary head. More particularly, the invention relates to a magnetic recording and reproducing device including such a mechanism having a reproducing rotary head disk and a recording rotary head disk mounted on the same rotary shaft.

FIG. 1 is a block diagram describing an operation of dubbing data with a conventional magnetic recording and reproducing device with a rotary head. In FIG. 1, reference numeral 1 designates a first recording and reproducing unit, and 2, 3, 4, 5, and 6, a rotary shaft, a rotary transformer, reproducing rotary heads, and a rotary disk of the first recording and reproducing unit 1, respectively. The video output of the first recording and reproducing unit 1 is applied to the video input terminal 10 of a second recording and reproducing unit 9, and is then applied through a conventional sound recording circuit to rotary heads 4' and 5'. In FIG. 1, reference numerals 2', 3', 4', 5', and 6' designate a rotary shaft, a rotary transformer, recording rotary heads, and a rotary disk of the second recording and reproducing unit 9, respectively.

The operation of the magnetic recording and reproducing device thus constructed will be described. The head outputs of the magnetic recording and reproducing unit 1 are applied from the A—CH (A—channel) head 4 and the B—CH (B—channel) head 5, which is fixedly mounted on the rotary disk 6 secured to the rotary shaft 2 through the rotary transformer 3, head amplifiers, a switcher, a mixer, a demodulating circuit, etc., to a video output terminal 7. The output provided at the video output terminal 7 is supplied through a signal path 8 (cable) to the video input terminal 10 of the magnetic recording and reproducing unit 9. The signal thus inputted is a video signal. The video signal is frequency modulated and amplified by a recording amplifier shown in the block diagram. The video signal thus processed is applied to the head. The input signal is applied to the rotary transformer 3 and is recorded by the A—CH head 4' and the B—CH head 5' which are provided on the rotary disk 6'. In this manner, the dubbing operation is accomplished.

In FIG. 1, a color circuit is not shown.

The conventional dubbing mechanism using a magnetic recording and reproducing device having rotary heads, constructed as described above, requires two similar magnetic recording and reproducing units. This tends to increase the amount of mechanical vibration, jitter, etc. Furthermore, since the two units employ different running systems, the tracking thereof is rather difficult. In addition, as the signal is demodulated and then modulated again, the picture quality is unavoidably low.

SUMMARY OF THE INVENTION

An object of the invention is thus to eliminate the above-described difficulties accompanying a conventional magnetic recording and reproducing device using rotary heads.

In accordance with this and other objects, the invention provides a magnetic recording and reproducing device in which a reproducing head disk and a recording head disk are mounted on the same shaft so that a dubbing operating can be carried out without lowering the picture quality.

DESCRIPTION OF THE PREFERRED EMBODIMENTS

A preferred embodiment of the invention will be described with reference to FIGS. 2 through 4.

Figure 1:
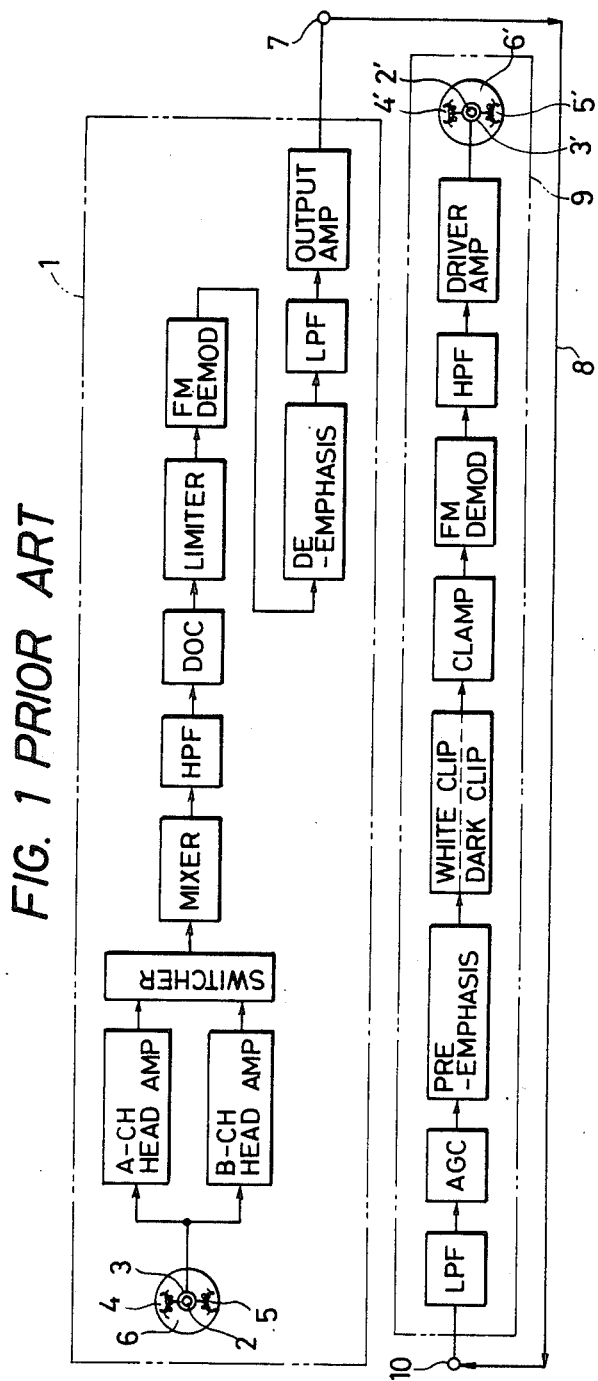
FIG. 1 is a block diagram showing a dubbing device according to the invention.
Figure 2:
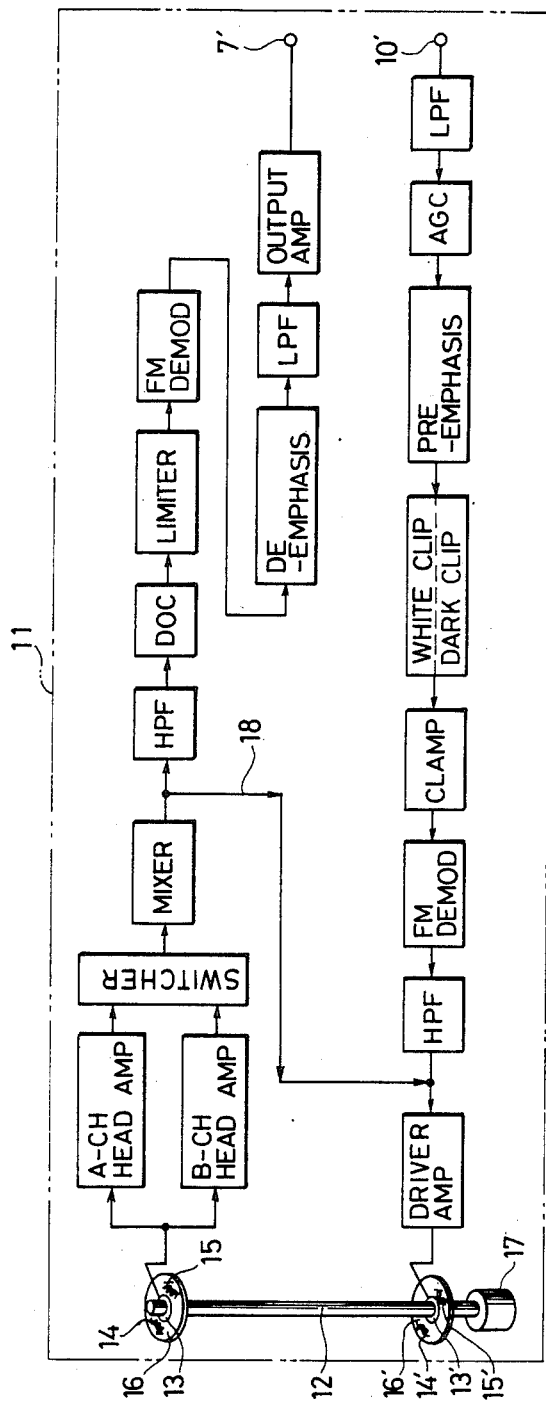
FIG. 2 is a block diagram showing the arrangement of a dubbing mechanism constructed according to the invention.

FIG. 2 is a block diagram showing the arrangement of a magnetic recording and reproducing device according to the invention. In FIG. 2, reference numeral 11 designates the magnetic recording and reproducing device of the invention, and 12, a rotary shaft on which two rotary heads are mounted. As shown in FIG. 4, a reproducing head assembly 13' through 16' is mounted on the lower part of the rotary shaft. The two rotary head assemblies are thus rotated by a drum motor 17 simultaneously.

Reproducing signals provided by the reproducing head assembly 13 through 16, after passing through a mixer circuit, are applied as an RF signal to the recording head assembly.

The recording and reproducing device shown in FIG. 3 will be described with reference to the block diagram of FIG. 2.

Signals provided by the A—CH head 14 and the B—CH head 15 on the rotary disk 16 of the reproducing head assembly are applied through the rotary transformer 13 to head amplifiers, where they are subjected to amplification. The signals thus amplified are applied through a switcher to a mixer. The output of the mixer is supplied through a path 18 to a recording amplifier. The output of the recording amplifier is applied through the rotary transformer 13' of the recording head assembly, fixedly secured on the rotary shaft 12 to the A—CH head 14' and the B—CH head 15' provided on the rotary disk 16', so as to be recorded. As described above, the reproducing head assembly and the recording head assembly are fixedly mounted on one and the same rotary shaft 12, which is driven by the drum motor 17.

Figure 3:
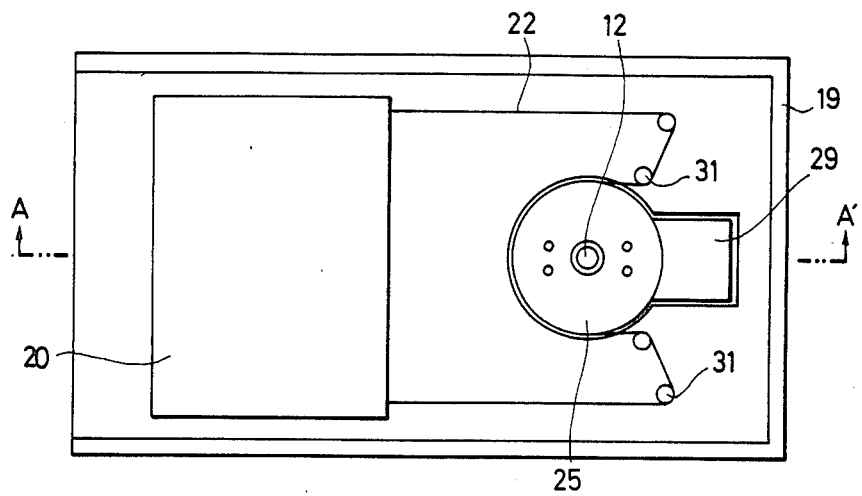
FIG. 3 is a plan view showing an example of a magnetic recording and reproducing device in the dubbing mechanism according to the invention.
Figure 4:
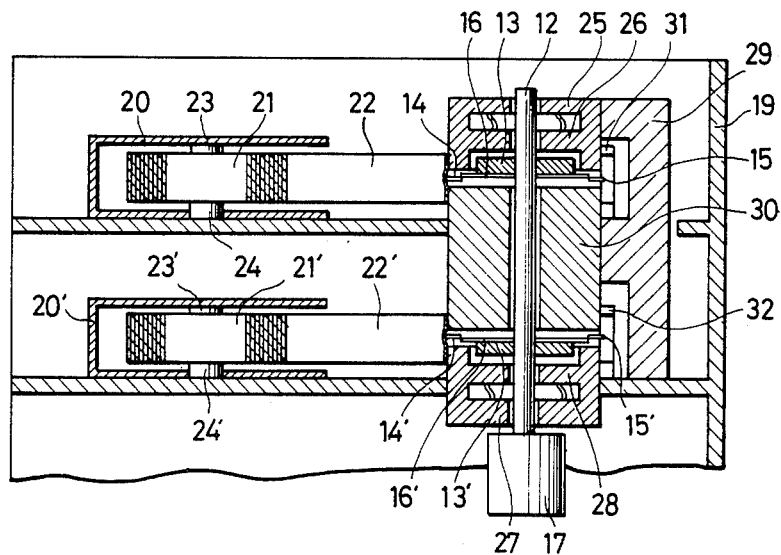
FIG. 4 is a sectional view taken along a line A—A in FIG. 2.

A specific example of the mechanism of the magnetic recording and reproducing device according to the invention is shown in FIGS. 3 and 4.

As shown in FIGS. 3 an 4, magnetic tape cassettes 20 and 20' are placed in the same case with the cassette 20 located above the cassette 20'. The upper magnetic tape cassette 20 is used for reproducing, while the lower magnetic tape cassette 20' is used for recording. The stator is placed above the rotor secured to the reproducing head disk. The reproducing output is obtained from the upper most part. On the other hand, the recording signal is applied to the stator from the lowermost part and is supplied to the recording head through the rotor provided on the stator.

The magnetic tape cassette 20 and the magnetic tape cassette 20' used for recording are loaded and threaded as shown in the figures. The magnetic tapes 22 and 22' thereof are wound on rotary drums, directed by tape guides 31 and 32, and run by reel shafts 24 and 24', respectively. For simplification of description, the detailed structures of the loading, threading and guiding mechanisms, and the employment of helical scanning will not be described since they are all well known.

The reproducing signal of the magnetic tape cassette 22 is outputted from the stator 26 provided on the upper drum 25 through the rotary heads 14 and 15 and the rotor of the rotary transformer 13. The signal, after being subjected to amplification, switching, mixing, and recording amplification, is supplied from the lower drum 27 through the stator 28 and the rotor 13' to the recording heads 14' and 15'. The middle drum serves as the reproducing lower drum and the recording upper drum. The middle drum and the lower drum are fixed by a drum retainer 29 which is secured to a chassis 19.

In the above-described embodiment, the rotary shaft is rotatably supported at one end thereof; however, it may be supported at both ends in order to improve its rotational stability.

In addition, it is possible to stack several rotary transformers to apply the reproducing output directly to the recording heads.

As is apparent from the above description, according to the invention, the reproducing rotary head and the recording rotary head are rotated by one and the same rotary shaft and one and the same drum motor; that is, the rotary shaft and the drum motor are used commonly for the two rotary heads. Therefore, the system control, the servo circuit, the electrical circuit, etc., can also be commonly used. Accordingly, the aforementioned vibration, jitter, CTL track shift, etc., are reduced. In association with the above-described effects, applying the reproduced RF signal to the recording heads simultaneously remarkably improves the picture quality.

What is claimed is:

1. A magnetic recording and reproducing device in which a reproducing signal outputted by first rotary head means is recorded by second rotary head means, comprising: a drum motor; a single rotary shaft rotated by said motor; a first rotary disk on which said first rotary head means is mounted; a second rotary disk on which said second rotary head means is mounted, said first and second rotary disks being mounted on said single rotary shaft in such a manner that said first and second rotary disks are rotated by said drum motor; first and second magnetic heads borne by said first and second rotary disks, respectively; first and second head amplifiers; means for coupling outputs of said first and second magnetic heads to said first and second head amplifiers, respectively; switching means receiving as inputs outputs of said first and second head amplifiers; mixer means receiving as an input an output of said switching means; and means for driving said second rotary head means in response to an output of said mixer means.

2. The magnetic recording and reproducing device of claim 1, further comprising means for rotatably supporting said rotary shaft at one end thereof.

* * * * *